Figure 1:
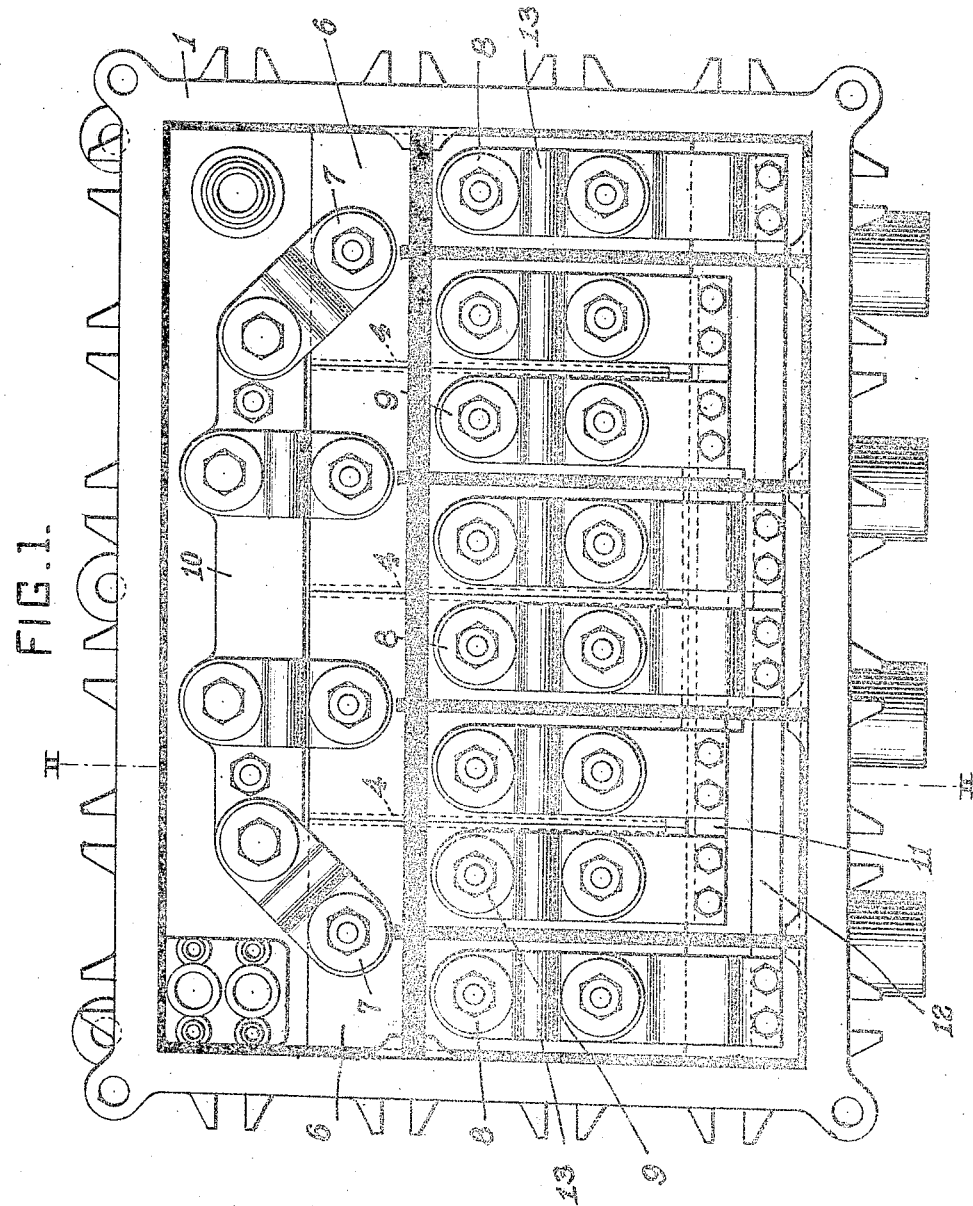

C. W. DAVIS.
JUNCTION BOX STRUCTURE FOR ELECTRICAL CONDUCTORS.
APPLICATION FILED JULY 1, 1909.

990,235.

Patented Apr. 25, 1911.

3 SHEETS—SHEET 1.

WITNESSES:
J. Herbert Bradley.
Francis J. Tomasson

INVENTOR
Charles W. Davis
by Christy and Christy
Att'ys

C. W. DAVIS.
JUNCTION BOX STRUCTURE FOR ELECTRICAL CONDUCTORS.
APPLICATION FILED JULY 1, 1909.
990,235.
Patented Apr. 25, 1911.
3 SHEETS—SHEET 2.
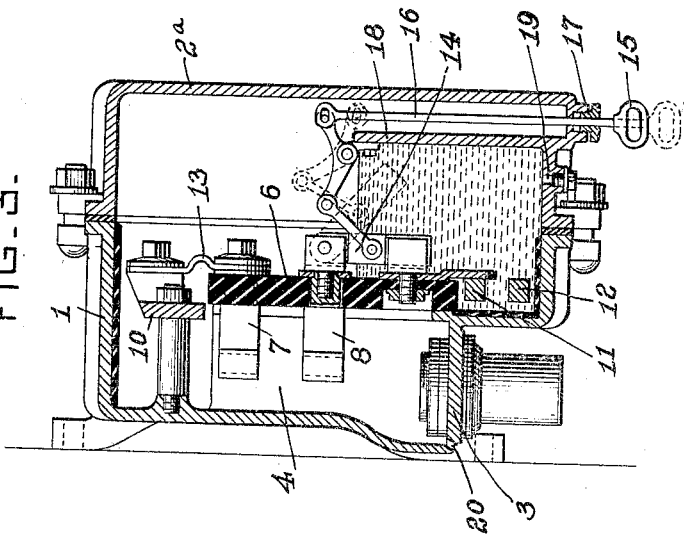
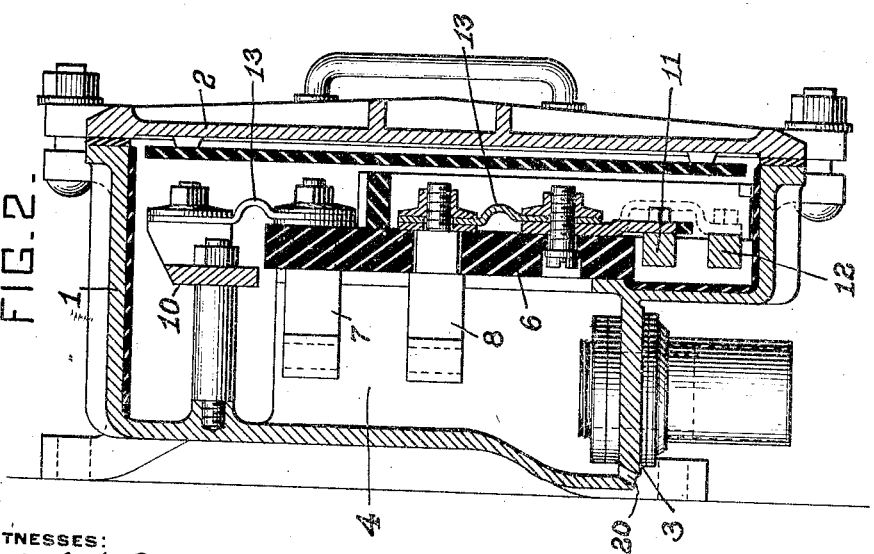

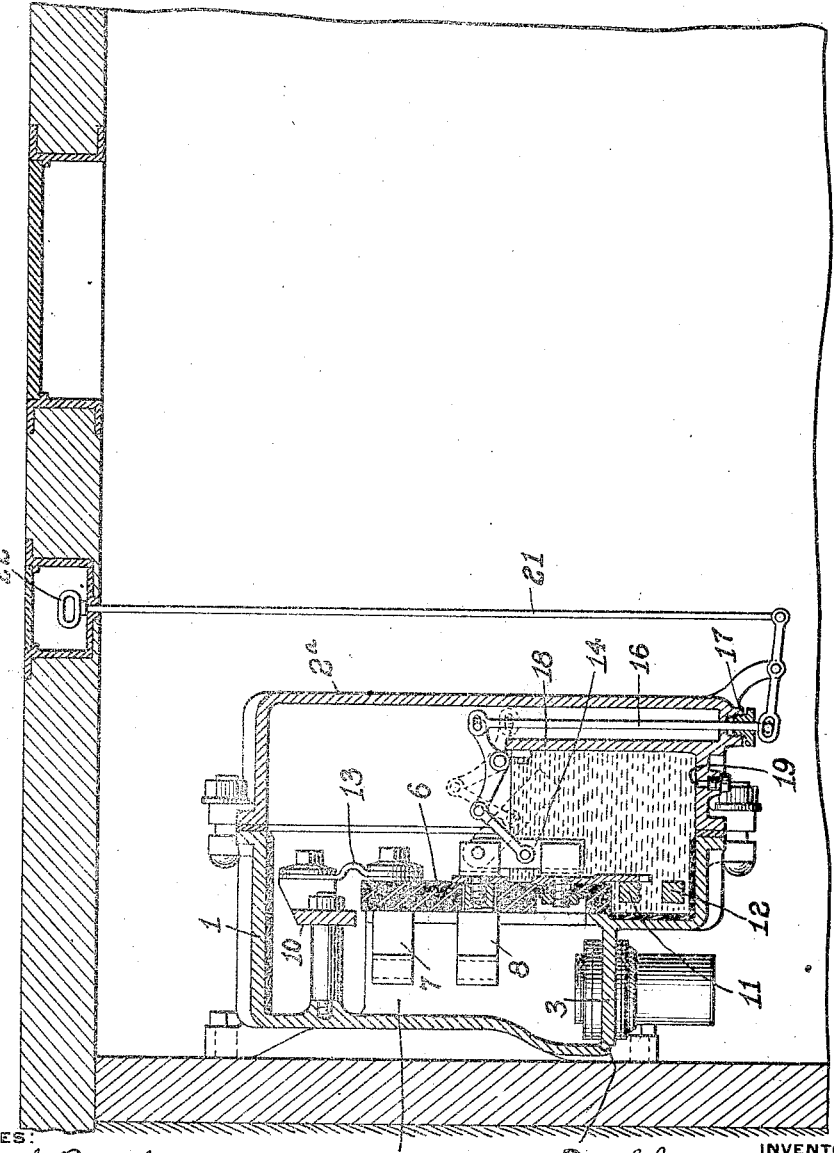

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURG, PENNSYLVANIA, A CORPORATION OF PENNSYLVANIA.

JUNCTION-BOX STRUCTURE FOR ELECTRICAL CONDUCTORS.

990,235. Specification of Letters Patent. Patented Apr. 25, 1911.

Application filed July 1, 1909. Serial No. 505,382.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Junction-Box Structures for Electrical Conductors, of which improvements the following is a specification.

My invention relates to improvements in the construction of junction boxes for electrical conductors; and the objects of my improvement are simplicity of structure and economy of space in designing junction boxes for multiple-conductor cables, and also adaptability to conditions of service. In ordinary city installations of electrical service lines, multiple-conductor cables are very largely used instead of single-conductor cables, for reason of economy. In such installations, junction boxes are employed at crossing places, ordinarily at street corners, where cables branch, and where it is desired to electrically connect crossing lines, to constitute what is known as the "interlinked" system of cable installation. A junction box is a structure which is ordinarily secured to the vertical wall of a man-hole beneath a street pavement, within which all the positive conductors of the introduced cables are brought into electrical continuity with one another, and all of the negative conductors of the introduced cables are in like manner connected together, and to that end there are ordinarily arranged within a junction box structure what are called bus-bars, to one of which all of the positives are connected and to another of which all of the negatives are connected.

Because of the conditions of installation, it is a first requisite in designing junction boxes that they be shallow as possible, projecting from the wall of the man-hole the least possible distance, and it is another requisite that the box with its connections shall extend in vertical direction the least possible distance. With single-conductor cables, the problems of junction-box designing are relatively simple, for such individual cables may be introduced through the wall of the junction box without elaborate structure; but, when it comes to multiple-conductor cables, difficulty arises, because the several conductors included in each cable must be separated, and each connected in proper manner within the box, each separate conductor being properly insulated. In other words, the problem is, how to bring a multiple-conductor cable up vertically to a box set as low as possible against the man-hole wall; and, in the smallest possible vertical space, introduce the cables, so that each separate conductor shall be properly insulated. One alternative is to separate the conductors of the cable outside of the junction box and bring each separated conductor into the junction box by itself, and in that case of course the junction-box structure will be substantially the same as the junction-box structure for single conductor cables. The objection however is that, in order to separate the individual conductors, a separate structure must be provided, a structure called a terminal, within which such separation is properly insulated; and this terminal structure is a bulky thing, and a source of objection for that reason. The other alternative in handling multiple-conductor cables is to carry the cables through the junction-box wall, and then, within the junction box, to separate the individual conductors and properly insulate and connect them. It is this latter alternative which is employed in my improved construction.

I provide the conductors of each cable introduced into the junction box with a separate chamber within the box, and in such chamber the separated conductors of each cable are immersed in insulating material, and from such chamber the several conductors are prolonged through a rigid supporting wall of insulating material, whose position and surface character are such as to reduce leakage to a minimum.

In the accompanying drawings which form part of this specification Figure 1 is a side elevation of a junction box embodying my invention, the lid which closes the box laterally being removed. Fig. 2 is a view in vertical transverse section of the same box with cover in place, the plane of section being indicated at II—II of Fig. 1. Figs. 3 and 4 are views similar to Fig. 2 illustrating modifications. In Fig. 4 there is shown also a portion of the wall and roof of the manhole.

Parts which are repeated in several figures bear the same reference numerals in every case.

The box in general shape is rectangular; and, by virtue of my improved construction, is of relatively small depth—by depth I mean the distance from the cover plate to the back wall, which is the wall ordinarily bolted against the vertical wall of the man-hole.

Referring to Figs. 1 and 2, the box will be seen to consist of a rectangular casing 1 and its lid or cover-plate 2. In the lower wall 3 of this box a series of orifices is formed, which extends in single line along the length of the box. The chamber within the box is divided incompletely, into a number of compartments. There is, first, a succession of partitions 4, preferably cast integral with the body of the box, arranged at intervals throughout the length of the box, projecting from the back wall of the box outward, and extending upward from the lowermost face of the box. These partitions preferably do not extend all the way across the box from rear wall to cover-plate. Another partition, 6, of insulating material (such, for example, as slate or porcelain) extends throughout the length of the box, at right angles to the partitions 4, and is clamped against the outer ends of the partitions 4. It extends from the lower wall 3 of the box upward, to form the series of compartments; and between the partition 6 and the lid 2 of the box an open chamber remains. The number of compartments so formed corresponds to the number of cable orifices, and the latter are so arranged that one orifice opens into each such compartment. The further details within each chamber which I am now about to describe are adapted for a three-wire cable; that is, a cable which carries a positive, a negative, and a neutral; but it will be understood that the arrangement may be varied in detail to suit the particular construction employed.

Confining attention to a single one of the compartments formed by the partitions 4 and the slab of slate 6, it will be observed that the slab of slate 6 carries in each compartment three pole pieces, 7, 8, and 9. The pole piece 7 is connected on the opposite side of the slate partition 6 with the bus-bar 10 which extends throughout the length of the box and is preferably arranged in the upper part thereof. The pole pieces 8 and 9 are, on the opposite side of the slab of slate 6, connected with bus-bars 11 and 12, which also extend throughout the length of the box, and are preferably located in the open chamber outside of the slate partition 6, and in the lower part of the box. In order to economize space, the lower part of the box is preferably offset, as shown in Figs. 2, 3, and 4, so that these bus-bars 11 and 12 may lie approximately in a common plane with the slate slab 6, to permit of the cover-plate 2 being brought nearer to the slab 6, thus reducing the depth of the box as a whole.

The mode of assembly will readily be understood. A cable introduced through an orifice 3, is secured in place in any suitable manner. Its several conductors, separated within a compartment 4 within the box, are sweated to the pole pieces, the neutral to the pole piece 7, and the positive and negative conductors to the pole pieces 8 and 9. The neutral is thus placed in communication with the bus-bar 10, which may or may not be grounded as desired, and the positive and negative are put in communication with the positive and negative bus-bars 11 and 12, to which all of the positive and negative conductors of the introduced cables lead. When the connections have thus been made, the compartment formed by the partitions 4 and the slab 6 are filled with insulating compound, immersing the otherwise exposed cable conductors and the pole pieces to which they are connected, and securing and insulating the whole structure.

In addition to the economy of space effected on this construction, it will be understood that access may be had to each compartment independently of the others, for the insertion and removal of a cable; and this is a very desirable thing in practical work. Furthermore, the surfaces of insulating material which extend between the pole pieces where they protrude through partition 6, are of such character and so positioned as to reduce to a minimum the possibility of leakage through accumulation of dust. It is also a matter of very appreciable advantage to be able to have access to the compartments behind partition 6 without disturbing the bus-bars. For example, after the box is installed, it may be found desirable to introduce a newly laid cable into one of the compartments of the box not previously occupied, and, with my improved design, it is possible to do this without disturbing the bus-bars from their positions. This is so because the bus-bars are arranged in the box beyond the edges of the removable partition 6.

In the modification shown in Fig. 3, the primary object is to permit of opening and closing a switch in the line of the flowing current, without the delay and difficulty incident to the opening of the box itself. It sometimes happens that under emergency it it desirable to thus break the circuit within the junction box.

Referring again to Fig. 2, the contact-piece between the pole piece 8 and the bus-bar 11 will be found indicated at 13. This contact-piece may be a simple and suitable length of conducting material, or it may be a fuse of any preferred nature. In the modification shown in Fig. 3, instead of having a simple connecting piece, I employ a knife-blade contact 14, such as is very commonly used as a switch in electrical installations. This knife-blade contact is operated by means of a handle 15, through a suitable lever mechanism, illustrated but not requiring particular description. This operating handle 15 is carried at the end of an operating rod 16 which extends through the wall of the junction box, preferably its lowermost wall, through a stuffing box 17; and, by operating this handle 15, the switch may be thrown open or closed as desired. Further, I preferably carry a wall 18 up from the lowermost wall of the box, parallel with the slate partition 6, to a point higher than the spring-jack of the switch. This partition 18 forms another compartment within the box, and this compartment may be filled with oil. This is desirable, because the knife-blade switch operating in oil is, as is well known, the most efficient of such make and break devices, when the voltage is at all great.

As shown in Fig. 3, the operating rod 16 with its handle 15 is carried out through the lid or cover 2ª of the box. The lever system which extends from the switch to the operating rod may include a separable connection, permitting the removal of the cover when desired.

The chamber formed by the partition 18 for including oil will necessarily have a drain orifice, such as 19, and the chamber formed by the partitions 5 and the slab of slate 6 will also preferably be provided with a drain orifice, such as 20.

In Fig. 4 I have shown the manner in which the modified structure of Fig. 3 may be arranged, so that the switch may be operated from outside of the manhole. An operating rod 21, connected with the switch-blade 14 through lever mechanism, extends up through the street pavement above, and terminates in a handle 22, which may be suitably protected in a covered recess sunk in the street pavement. The arrangement shown in Fig. 4 has this further advantage, that the switch may be operated, even though the box within the man-hole be submerged in water, a condition which is not uncommon in service. The construction is such as to exclude water from the working parts of the box and still permit the switch to be opened and closed. These structures are ordinarily made water-tight against damage, if submerged. It is impossible to have an operating arm pass through the box wall without danger of leakage; but, by forming the opening in the bottom of the box, and providing the partition 18, the water which may enter at 17 can do no harm; the consequent compression of the air within the box will, even in case of complete submergence, prevent the water from rising above the edge of partition 18.

I claim herein as my invention:

1. A junction box for multiple-conductor cables consisting of a casing, a partition extending upward from the lowermost wall of the casing and dividing the space within, the space on one side of said partition being further divided into a plurality of separate compartments, and an orifice for the introduction of a cable formed in the junction-box wall and opening into each of such compartments, and pole-pieces extending through said partition and into each of said compartments, substantially as described.

2. A junction box for multiple-conductor cables adapted to be secured against a vertical wall, and consisting of a casing provided with a removable lid or cover plate which forms the exposed side when the box is applied to a vertical wall, a partition arranged within the casing, extending upward from the lowermost wall thereof and substantially parallel with said cover plate, with space intervening between said partition and the back wall of the box on one side, and between said partition and the said cover plate on the other side, the space between the said partition and the rear wall of the box being subdivided to form a plurality of compartments, a plurality of orifices formed in the lowermost wall of said box and opening into each of said compartments, and pole-pieces extending through said partition from the space between said partition and the cover plate into each of said compartments, substantially as described.

3. In a junction box for multiple-conductor cables the combination of a casing having an off-set or step in its lowermost wall, a partition clamped against the vertical face of such step and extending upward to divide the chamber within the junction box, pole-pieces extending through said partition, and bus-bars arranged in said off-set portion of the lowermost wall of the junction box and substantially in line with said partition, and connections between the several said pole pieces and bus-bars, substantially as described.

4. In a junction box, the combination of a partition within the box extending upwardly from the lowermost wall toward the uppermost but spaced from the latter, a pole piece extending through said partition from side to side, a bus-bar arranged in the upper part of the junction box chamber and above the upper edge of said partition, and connection between said pole piece and said bus-bar, substantially as described.

5. In a junction box the combination of a shell or casing, a vertically disposed partition dividing the chamber within the junction box, and provided with pole-pieces extending transversely therethrough, the space on one side of said partition being further subdivided into a plurality of compartments, into each of which a pole piece extends, and the space on the other side of said partition being further divided by a partition parallel with said first-named partition and extending upward from the lowermost wall of said box to form with said first-named partition and the box walls a receptacle into which fluid may be introduced to submerge the protruding ends of said pole-pieces, substantially as described.

6. In a junction box for multiple-conductor cables, the combination of a casing, a partition extending from the side and bottom of said casing part way across the interior thereof, a partition removably secured within the casing against the free edge of said first-named partition, and forming with said first-named partition a plurality of compartments within said casing, orifices in the wall of said casing opening into compartments on one side of said removable partition, pole pieces extending through said removable partition into each of the several compartments on one side thereof, and bus-bars arranged within said casing beyond the edges of said removable partition, substantially as described.

7. In a junction box for electrical conductors, a partition extending upward from the bottom of the box and dividing the space within into separate chambers, an electric joint arranged within the box on one side of said partition, and including a make-and-break device, an operating rod extending through the junction box wall into the chamber on the opposite side of said partition, and operative connection between said rod and said make-and-break device, such connection extending from one side of said partition to the other at a higher level than the point at which said operating rod passes through the wall of the box, substantially as described.

In testimony whereof, I have hereunto set my hand.

CHARLES W. DAVIS.

Witnesses:
CHARLES BARNETT,
THEODORE DUFF.